No. 815,135. PATENTED MAR. 13, 1906.
W. WYAND.
ROTARY ENGINE.
APPLICATION FILED JULY 27, 1905.
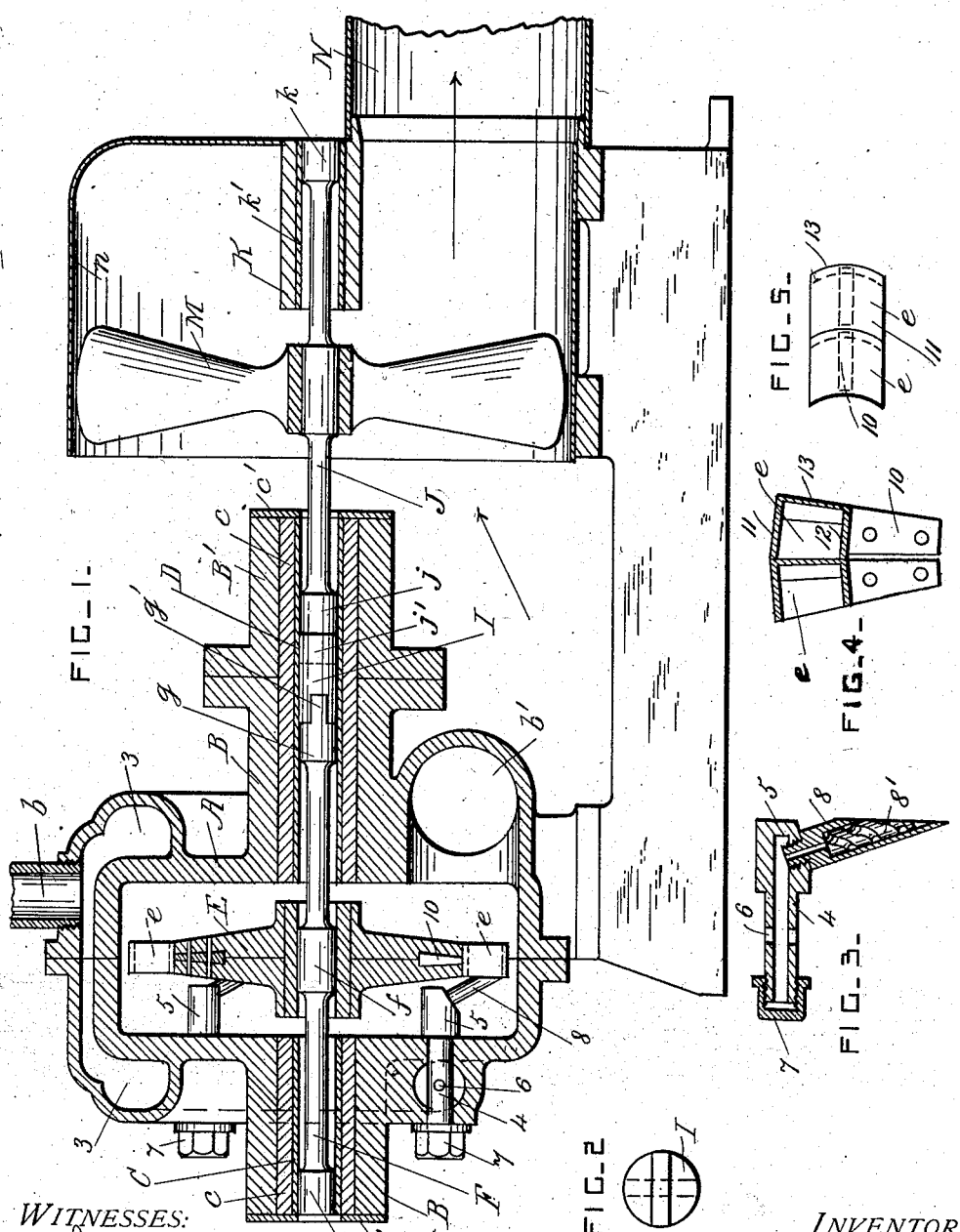
WITNESSES:
INVENTOR
William Wyand.
By Herbert W. T. Jenner.
Attorney

UNITED STATES PATENT OFFICE.

WILLIAM WYAND, OF COLLINGSWOOD, NEW JERSEY.

ROTARY ENGINE.

No. 815,135.   Specification of Letters Patent.   Patented March 13, 1906.

Application filed July 27, 1905. Serial No. 271,533.

*To all whom it may concern:*

Be it known that I, WILLIAM WYAND, a citizen of the United States, residing at Collingswood, in the county of Camden and State of New Jersey, have invented certain new and useful Improvements in Rotary Engines; and I do hereby declare the following to be a full, clear, and exact description of the invention, such as will enable others skilled in the art to which it appertains to make and use the same.

This invention relates to rotary engines of the turbine or impact type; and it consists in the novel construction and combination of the parts hereinafter fully described and claimed.

In the drawings, Figure 1 is a longitudinal section through an engine constructed according to this invention. Fig. 2 is a detail end view of the double coupling member. Fig. 3 is a sectional plan view through one of the steam-inlet nozzles drawn to a larger scale. Fig. 4 is a detail side view of two of the steam-buckets. Fig. 5 is a plan view of the same.

A is the cylinder or casing of the engine, which is provided with a steam-inlet $b$ and a steam outlet or exhaust $b'$. This cylinder or casing is preferably formed of two separable sections or halves, which are bolted or otherwise secured together.

B represents bearings on the cylinder or casing for the driving-shaft to revolve in. These bearings are very long, and one of them is preferably provided with an extension $B'$. These bearings are preferably provided with bearing-bushes $c$, formed of antifriction metal and secured in them. C and D are tubes which revolve in the said bearing-bushes and which are provided with means which prevent them from sliding longitudinally out of the said bearing-bushes. Any approved means for this purpose may be used, such as the plates $c'$. E is the steam-wheel which is arranged inside the said cylinder and provided with a series of buckets $e$ at its periphery. This steam-wheel is secured on an enlargement $f$ of the driving-shaft section F. This shaft-section F is provided at one end with an enlargement $g$, which is slidable in the tube D, and this enlargement $g$ is provided with a clutch member $g'$. The other end portion of the shaft-section F is provided with an enlargement $h$, which is secured in any approved manner in the outer end portion of the tube C.

I is a double clutch member, which is secured in the middle part of the tube D in any approved manner, such as by shrinking the tube upon the said double clutch member. The clutch member $g'$ engages with one end portion of the said double clutch member. J is a driving-shaft section, which is provided at one end with an enlargement $j$, which is slidable in the tube D and which is provided with a clutch member $j'$, which engages with the other end portion of the said double clutch member. The other end portion of the driving-shaft section J is provided with an enlargement $k$, which is secured in any approved manner in a tube $k'$, which revolves in a stationary bearing K.

A fan-wheel, air-propeller, or other similar driving-wheel M is secured on an enlargement $m$ on the middle part of the driving-shaft section J. In the example shown in the drawings a fan or propeller is provided which works in a casing $n$ and drives a blast of air up a delivery-pipe N for any purpose to which an air-blast is applicable.

Each half of the cylinder or casing A is provided with a steam-distributing chamber 3, and 4 represents tubes which pass through these chambers. These tubes have hollow heads 5 on the inside of the cylinder and perforations 6, which communicate with the said steam-chambers. The other ends of the tubes are screw-threaded and project through the outer side walls of the said steam-chambers. Caps 7 are screwed on the projecting end portions of the said tubes, so that they are closed and held in position. Steam-jet nozzles 8 are screwed into the heads 5 and are arranged in suitably-inclined positions so as to discharge the jets of steam into the buckets of the steam-wheel near the periphery of the said wheel and to the best advantage. Spiral guides 8' are secured in the said steam-jet nozzles, so that a whirling motion is imparted to the steam as it passes through the jet-nozzle. This method of distributing the steam has been found advantageous in driving a turbine-wheel by steam.

The steam-wheel E is preferably formed of two disks, and the buckets $e$ preferably have dovetailed stems 10, which are clamped between these said disks. Each bucket has a top 11 and a bottom 12, which are connected by a concavo-convex front face 13. The interior face of the bucket is concave, and the face of each bucket closes the open rear part of the bucket next in front of it. The dovetailed stems 10 project from the bottoms 12 of the buckets, and the said buckets and stems are wedge-shaped, so that they fit together in a series around the periphery of the steam-wheel.

The formation of the driving-shaft permits the steam-wheel and fan-wheel to balance themselves automatically.

What I claim is—

1. The combination, with a cylinder provided with a long bearing on one side, of a tube journaled in the said bearing and provided with a double clutch member at its middle part, a driving-shaft member having an enlargement and a clutch member at one end which is slidably connected with the said tube and one end of its double clutch member, a motor-wheel secured on the said shaft inside the said cylinder, and a second driving-shaft member provided with an enlargement and a clutch member which is slidably connected with the said tube and the other end of the said double clutch member.

2. The combination, with a cylinder provided with bearings, of tubes journaled in the said bearings, a clutch member secured in one of the said tubes, a driving-shaft provided with an enlargement at one end which is connected with one of the said tubes and which has an enlargement and a clutch member at its other end which engages slidably with the other said tube and clutch member, and a motor-wheel mounted on the middle portion of the said shaft inside the cylinder.

3. The combination, with a cylinder provided with bearings, of a tube journaled in one of the said bearings, a clutch member secured in the said tube, a driving-shaft supported by the said bearings and provided with an enlargement at one end which engages slidably with the said tube and clutch member, and a motor-wheel mounted on the middle part of the said shaft inside the cylinder.

4. The combination, with three stationary bearings, of tubes journaled in the end bearings, a tube journaled in the middle bearing and provided with a double clutch member at its middle part, shaft-sections having enlargements at their outer ends which are connected with the said tubes in the end bearings and having also enlargements and clutch members at their adjacent ends which engage slidably with the said tube and its double clutch member, a motor or driving-wheel on the middle part of one shaft-section, and a power-transmitting wheel or device on the middle part of the other said shaft-section.

5. The combination, with a cylinder having a steam-chamber at its side, of a steam-tube projecting through the said chamber and having a hollow head inside the said cylinder, a cap closing the projecting outer end of the said tube, a steam-jet nozzle carried by the said head, and a steam-wheel journaled inside the said cylinder.

In testimony whereof I have affixed my signature in the presence of two witnesses.

WILLIAM WYAND.

Witnesses:
E. M. BOND,
M. B. BROWN.